R. COOK.
RAT TRAP.
APPLICATION FILED AUG. 30, 1921.
1,427,784.
Patented Sept. 5, 1922.
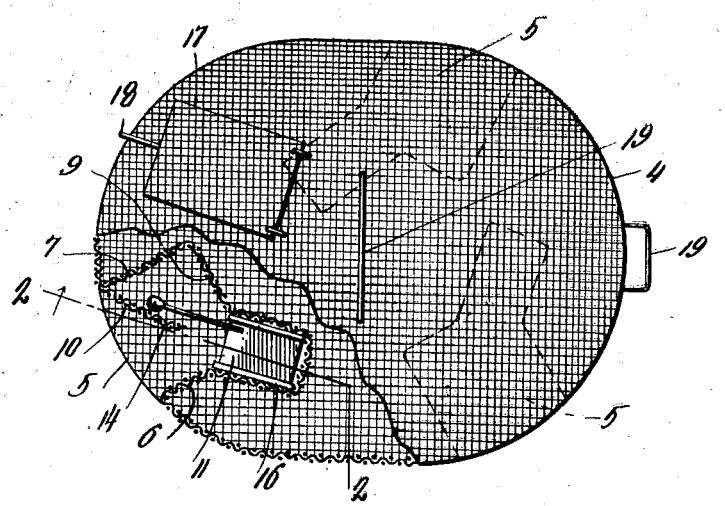
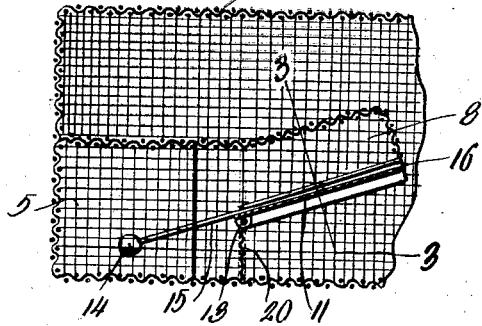
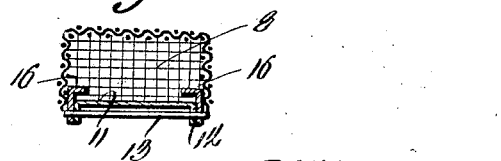
WITNESSES
Guy M Spring
Inventor
RICHARD COOK
By Richard B Owen
Attorney Patented Sept. 5, 1922.

1,427,784

UNITED STATES PATENT OFFICE.

RICHARD COOK, OF NEW YORK, N. Y.

RAT TRAP.

Application filed August 30, 1921. Serial No. 496,839.

*To all whom it may concern:*

Be it known that I, RICHARD COOK, a citizen of the United States, residing at New York, in the county of New York and State of New York, have invented certain new and useful Improvements in Rat Traps, of which the following is a specification.

This invention relates to rat traps and more especially to self-set and everset traps. An object of the invention is to provide a trap having a plurality of entrances through anyone of which a rat may enter and be automatically trapped, thereby enhancing the chances of catching the rats in a minimum period of time.

Another object of this invention is to provide a trap of simple construction which will require no other attention from the user other than to replenish the bait from time to time.

The above and other objects of this invention will be in part described and in part understood from the following description of the accompanying drawings wherein:—

Fig. 1 is a top plan view of a trap constructed in accordance with this invention, a portion thereof being broken away to disclose details.

Fig. 2 is a sectional view taken on the line 2—2 of Fig. 1 looking in the direction of the arrow; and Fig. 3 is a sectional view taken on the line 3—3 of Fig. 2.

The preferred form of this invention as illustrated in the accompanying drawings consists of a wire mesh body or casing 4 which is shown in the present instance to be of an oval shape configuration although of course other shapes may be used if desired. The body is completely closed except for a plurality of entrances 5, three of which are shown in the type of trap illustrated.

Each entrance has side walls 6 and 7, both of which have the inner ends thereof formed and connected to provide a passage way 8. An intermediate portion of the wall 7 is deflected at right angles, as indicated at 9, which, in conjunction with a guard wall 10 forms a compartment for a purpose hereinafter set forth.

A platform 11 is pivotally mounted in each of said passage ways and in this instance consists of a metal plate one end of which has portions of its margins bent downwardly at right angles to provide ears 12 through which a shaft 13 extends. The platform is set at an inclination and is held in this position by a counter-weight 14. This counter-weight is carried by one end of a rod 15, the opposite end of the latter being secured to the upper face of the platform and in close proximity to one of the lateral margins thereof. Upward movement of the platform is limited by flanges 16 which are arranged upon the side walls of the passage. As shown to advantage in Fig. 1, the counterweight 14 normally lies in the compartment provided by the walls 9 and 10. Consequently, interference by the rat with the counterweight, when going into the passage way, is precluded.

A door 17 is hingedly mounted in the top of the trap 4 and is equipped with a locking clasp 18 which is positioned over the top of the trap and engages the side of the latter. Through this door rats may be removed. For convenience in handling the trap, hand grips 19 are provided one of which is carried by the top of the trap and the other by one end of the latter.

In use of this device it is the intention to place the bait wherever the most beneficial results will be obtained. It is found, however, that by suspending the bait from the top of each passage way, in any desired manner, that most successful results will be obtained. The rat will enter the trap through one of the entrances 5 and will be guided into the passage way by the guard wall 10. The inner end of the platform is spaced from the bottom of the trap so that the rat, in order to get the bait suspended from the top of the passage way must jump onto the platform 11. Impact of the rat on the platform will cause the latter to move downwardly in the arc of a circle rapidly to prevent the rat from catching itself and retracting its steps. Of course, as is apparent when the platform is deflected under weight of the rat, the latter will slide off or gravitate from the platform onto the bottom of the trap. The platform will immediately be reset automatically by the counter weight 14. A wire mesh wall 20 is extended upwardly from the bottom of the body of the trap to the fulcrum point or the shaft 13 to prevent the trap from going beneath the platform.

From the above it is apparent that by providing a trap with a plurality of entrances as above described, the chances of catching the rats will be enhanced and the trap will successfully prevent escape of the latter.

Various changes may be made in the device, especially in the details of construction proportion and arrangement of parts without departing from the spirit and scope of the invention as covered in the appended claim.

What is claimed is:—

A trap including a reticulate body, reticulate walls mounted on the floor of said body, said walls forming a rectangular room having one of its corners extended to provide a passage way, and a platform pivotally mounted in said passage way and equipped with a rod extending toward one of said walls and carrying a weight, and a guard wall rising up from the floor of said body to form in conjunction with one of the side walls, a compartment for the weight.

In testimony whereof I affix my signature in presence of two witnesses.

RICHARD COOK.

Witnesses:
 HOBERT JONES,
 MIKE BUTLER.